United States Patent [19]

Kremer

[11] Patent Number: 5,406,549
[45] Date of Patent: Apr. 11, 1995

[54] RING INTERWORKING BETWEEN PATH-SWITCHED RING TRANSMISSION SYSTEMS

[75] Inventor: Wilhelm Kremer, Andover, Mass.

[73] Assignee: AT&T Corp., Murray Hill, N.J.

[21] Appl. No.: 141,172

[22] Filed: Oct. 22, 1993

[51] Int. Cl.$^6$ .................... H04L 12/42; H04L 12/66
[52] U.S. Cl. ................................ 370/16.1; 370/85.14
[58] Field of Search ................... 370/16, 16.1, 58.2, 370/58.3, 85.9, 85.12, 85.13, 85.14; 455/8, 16; 375/40; 371/8.1, 8.2, 11.1, 11.2, 20.6, 20.2

[56] References Cited

U.S. PATENT DOCUMENTS

| | | | |
|---|---|---|---|
| 4,683,563 | 7/1987 | Rouse et al. | 370/16.1 |
| 5,179,548 | 1/1993 | Sandesara | 370/16.1 |
| 5,218,604 | 6/1993 | Sosnosky | 370/85.14 |
| 5,278,824 | 1/1994 | Kremer | 370/16.1 |
| 7,855,795 | 3/1992 | Kremer . | |

OTHER PUBLICATIONS

"SONET Add-Drop Multiplex Equipment (SONET ADM) Generic Criteria for a Unidirectional, Path Protection Switched, Self-Healing Ring Implementation", Bellcore Technical Advisory TA-TSY-000496, Issue 3, Aug. 1990 pp. i-8-1.

"Ring Interworking Issues, Solutions and Product Implications and FT-2000" Engineer's Notes by W. Kremer, AT&T, Mar. 23, 1993 8 pages.

"SWB Ring Interconnection Architecture Issues and Proposed Interim Solutions", Contribution to T1 Standards Project, T1X1.2, by Joseph Sosnosky and Jonathan A. Morgan, Bellcore, Mar. 1, 1993 pp. 1-6.

"SONET Ring Interworking Issues" Committee T1 Contribution, T1X1.2/93-003 by Barbara E. Smith Southwestern Bell Technology Resources, Inc., and Cliff Yackle, Southwestern Bell Telephone Company, Mar. 1, 1993 pp. 1-18.

"Ring Interworking With A Bidirectional Ring" Contribution to T1 Standards Project, T1X1 . . 5/91-043, by W. Kremer, AT&T, Apr. 15, 1991 26 pages.

*Primary Examiner*—Benedict V. Safourek
*Attorney, Agent, or Firm*—Thomas Stafford

[57] ABSTRACT

The possibility of passing off apparent "good" higher level digital signals that may include corrupted or failed lower level digital signals because of inter-ring grooming of the lower level digital signals from one path-switched ring to another path-switched ring employing at least a first shared node and a second shared node is minimized by dual feeding communications circuits from one path-switched ring to the other via the shared nodes and by provisioning at least one inter-ring groomed communications circuit from a secondary ring node of one of the shared nodes (secondary communications circuit) of a particular ring to be supplied to a primary ring node in the other shared node of the same ring. The at least one secondary communications circuit is obtained in the primary ring node and demultiplexed so that the lower level digital signals in the at least one communications circuit can be evaluated on a one-to-one pairwise basis with corresponding lower level digital signals in the corresponding at least one communications circuit (primary communications circuit) being supplied from the inter-ring grooming apparatus associated with the primary ring node. The the "best" of the lower level signals in each are selected and are combined into a "new" primary communications circuit which is dual fed in the primary ring node in one direction to its termination ring node and in the other direction through the secondary ring node to the termination ring node. transmission path. A selector in the secondary ring node is revertively biased to normally select the "new" primary communications circuit to be supplied to the termination ring node. However, in the case of a primary communication circuit failure because of an interconnect or other failure in the primary ring node, the selector will then select the secondary communication circuit to be supplied to the termination ring node for the primary ring node. The provisioning of the primary ring node and the secondary ring is such that the demultiplexing to obtain the lower level digital signals, their evaluation and selection, and multiplexing only need to be done in the primary ring node and not in both.

9 Claims, 7 Drawing Sheets

RING INTERWORKING BETWEEN PATH-SWITCHED RING TRANSMISSION SYSTEMS

CROSS-REFERENCE TO RELATED APPLICATIONS

United States patent applications Ser. No. 08/141,151, and Ser. No. 08/141,141, were filed concurrently herewith.

1. Technical Field

This invention relates to ring transmission systems and, more particularly, to interworking between path-switched ring transmission systems.

2. Background of the Invention

It has become increasingly important to maintain communications connectivity in the presence of transmission system failures. To this end, ring interworking arrangements have been proposed for transporting communications circuits between path-switched rings. Ring interworking is essentially a dual feed of communications circuits from a first ring to a second ring. The dual feeding takes place across two different sites, each with ring nodes for both the first and second rings, in order to provide the physical diversity necessary to enable the cross-ring communications circuits to survive a failure of one of the two shared sites. The second ring performs a receive switch based on some parameter or set of parameters of the two signals being fed from the first ting. For the other direction of the same end-to-end cross-ring communications circuits, the second ring dual feeds communications circuits to the first ring. The first ring performs a receive switch of the two signals being fed from the second ring.

A problem arises when there is a need to groom the inter-ring communications traffic by way of intervening wide-band digital cross-connect systems (DCS), multiplexers (MUX) or the like, where the grooming is being done at a different digital signal level, i.e., bit rate, than is being used in the rings. Examples are DS1 digital signals in DS3 signals and VT SONET signals in STS-1 SONET signals. In such arrangements, if a failure occurs incoming to the DCS, MUX or other grooming apparatus from one ring, it will not be recognized by the other ring because the inter-ring grooming apparatus will only insert the DS1 or VT failure indication and not the DS3 or STS-1 failure indication. Consequently, the inter-ring groomed signals, i.e., DS3s or STS-1s, passed off to either ring could appear to be "good" but could, in fact, contain corrupted or failed lower level digital signals, i.e., DS1s or VTs.

One attempt at avoiding the problems associated with inter-ring grooming of lower level digital signals in the higher level digital signals employed in interworking path-switched rings is described in a contribution to T1 Standards Project T1X1.2 entitled "SWB Ring Interconnection Architecture Issues and Proposed Interim Solutions", T1X1.2/93-013, dated Mar. 1, 1993. The pathswitched ring solution proposed in the noted Contribution T1X1.2/93-013 is an inefficient arrangement requiring the use of additional service bandwidth between the shared interworking nodes, the use of additional equipment in the nodes and the use of more interface and grooming capacity in the inter-ring grooming apparatus.

SUMMARY OF THE INVENTION

The problems related to the possibility of passing off apparent "good" higher level, i.e., bit rate, digital signals that may include corrupted or failed lower level, i.e., bit rate, digital signals because of inter-ring grooming of the lower level digital signals from one path-switched ring to another path-switched ring employing at least a first shared node and a second shared node are overcome, in accordance with the invention, by dual feeding communications circuits from one path-switched ring to the other via the shared nodes and by provisioning at least one inter-ring groomed communications circuit from a secondary ring node of one of the shared nodes (secondary communications circuit) of a particular ring to be supplied to a primary ring node in the other shared node of the same ring. The at least one secondary communications circuit is obtained in the primary ring node and demultiplexed so that the lower level digital signals in the at least one communications circuit can be evaluated on a one-to-one pairwise basis with corresponding lower level digital signals in the corresponding at least one communications circuit (primary communications circuit) being supplied from the inter-ring grooming apparatus associated with the primary ring node. The "best" of the lower level signals in each are selected and are combined into a "new" primary communications circuit which is dual fed in the primary ring node in one direction to its termination ring node and in the other direction through the secondary ring node to the termination ring node.

A selector in the secondary ring node is revertively biased to normally select the "new" primary communications circuit to be supplied to the termination ring node. However, in the case of a primary communication circuit failure because of an interconnect or other failure in the primary ring node, the selector will then select the secondary communication circuit to be supplied to the termination ring node for the primary ring node. The provisioning of the primary ring node and the secondary ring node is such that the demultiplexing to obtain the lower level digital signals, their evaluation and selection, and multiplexing need only be done in the primary ring node and not in both.

Specifically, the inter-ring groomed at least one secondary communications circuit is demultiplexed to obtain the lower level digital signals from the groomed secondary communications circuits. The primary and corresponding secondary lower level digital signals are evaluated on a one-to-one pairwise basis to determine the "best38 signal of each pair. Then, the determined best lower level digital signals from either the primary communication circuit or the secondary communications circuit am selected by selectors to be multiplexed into a "new" primary inter-ring groomed communications circuit. The "new" primary communications circuit is then dual fed in the primary ring node to be transported in both directions around the ring to the termination ring node.

DETAILED DESCRIPTION

Figure 1:
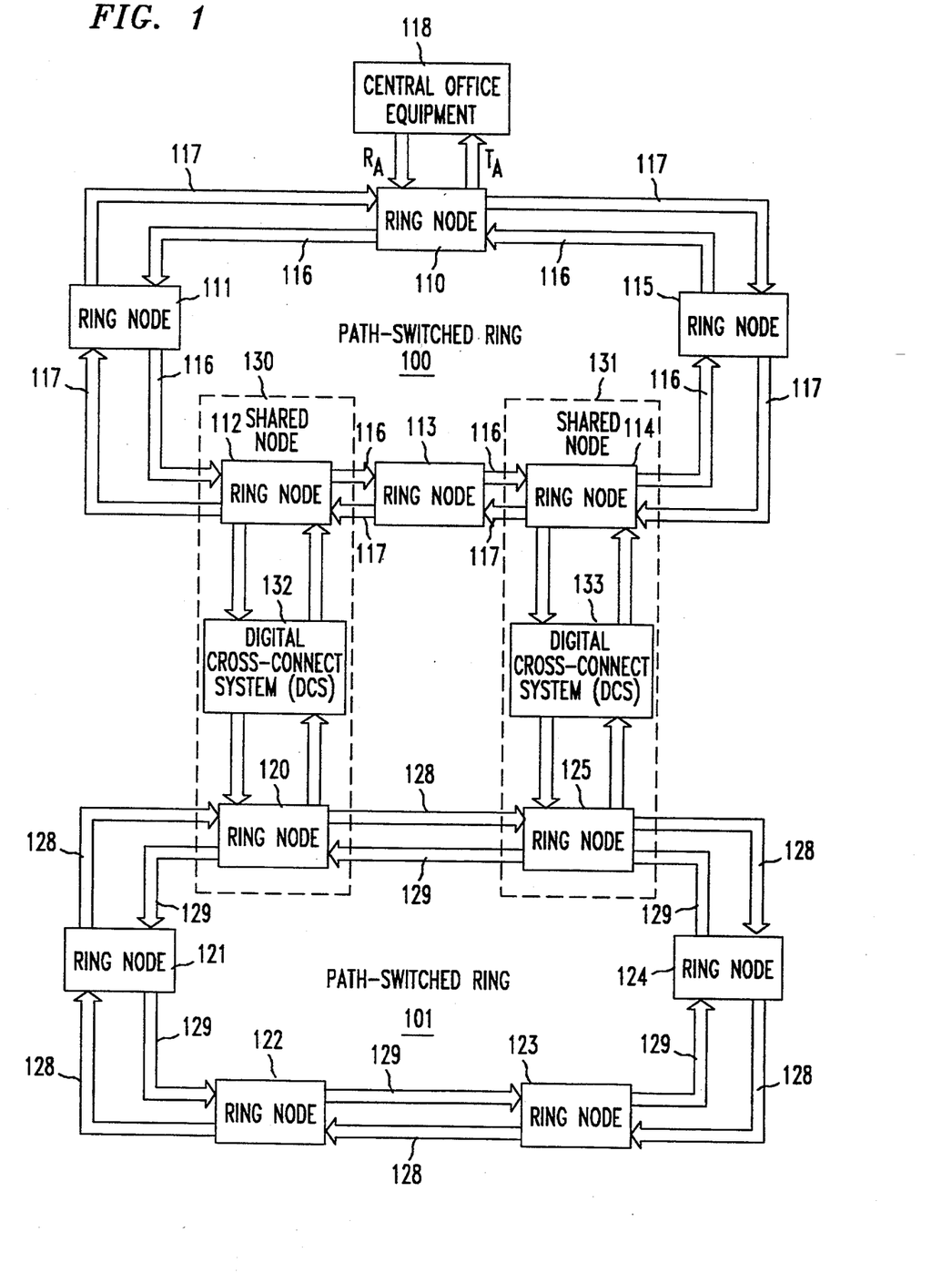
FIG. 1 shows, in simplified block diagram form, a path-switched ring transmission system interworking with another path-switched ring transmission system including inter-ring grooming.

FIG. 1 shows, in simplified form, path-switched ring transmission system 100 interworking with another pathswitched ring transmission system 101. In this example, path-switched ring 100 includes ring nodes 110 through 115, and the other path-switched ring 101 includes ring nodes 120 through 125. Ring nodes 112 and 120 form first shared node 130 for interworking communications circuits between path-switched ring 100 and path-switched ring 101. Similarly, ring nodes 114 and 125 form an additional shared node 131 for interworking communications circuits between path-switched ring 100 and path-switched ring 101. In this example, ring nodes 112 and 120 in shared node 130 are shown as being interconnected by inter-ring grooming apparatus, namely, digital cross-connect system (DCS) 132. Similarly, ring nodes 114 and 125 in shared node 131 are shown as being interconnected by inter-ring grooming apparatus, namely, digital cross-connect system (DCS) 133. Both DCS 132 and DCS 133 are so-called wide-band cross-connect systems of a type known in the art and described in the Technical Reference entitled "Wideband and Broadband Digital Cross-Connect Systems Generic Requirements and Objectives", TR-TSY-000233, Issue 2, September 1989, Bell Communications Research. It will be apparent that other wide-band grooming apparatus may be equally employed to realize the inter-ring grooming of communications circuits. One other such inter-ring grooming apparatus is a wide-band digital multiplex system, for example, the DDM-2000 Multiplex System available from AT&T Company.

Ring nodes 110 through 115 are interconnected by transmission path 116 in a counter-clockwise direction and by transmission path 117 in a clockwise direction to form path-switched ring 100. In this example, transmission paths 116 and 117 are comprised of optical fibers and, typically, each is comprised of a single optical fiber. Such path-switched ring transmission systems are known. Similarly, ring nodes 120 through 125 are interconnected by transmission path 128 and by transmission path 129 to form path-switched ring 101. In this example, transmission of digital signals in the SONET digital signal format is assumed. However, it will be apparent that the invention is equally applicable to other digital signal formats, for example, the CCITT synchronous digital hierarchy (SDH) digital signal formats. In this example, it is assumed that an optical OC-N SONET digital signal format is being utilized for transmission over transmission paths 116 and 117 in path-switched ring 100 and a similar or some other digital signal over transmission path 128 in path-switched ring 101. The SONET digital signal formats are described in a Technical Advisory entitled "Synchronous Optical Network (SONET) Transport Systems: Common Generic Criteria", TA-NWT-000253, Bell Communications Research, Issue 6, September 1990.

For purposes of this description, a "communications circuit" is considered to be a SONET STS-3 digital signal having its entry and exit points on the particular ring. However, for brevity and clarity of exposition, the inter-ring grooming will be described using STS-1 SONET signals as the higher level signals and VT SONET signals as the lower level signals. Again, other digital signal formats may be equally employed. Another example of such digital signal formats are the known DS3 and DS1 digital signals. Additionally, the SDH STM and SDH VC lower order digital signal formats maybe equally employed.

Each of ring nodes 110 through 115 and 120 through 125 comprises an add-drop multiplexer (ADM). Such add-drop multiplexer arrangements are known. For generic requirements of a SONET based ADM see the Technical Reference entitled "SONET ADD-DROP Multiplex Equipment (SONET ADM) GENERIC CRITERIA", TR-TSY-000496, Issue 2, September 1989, Supplement 1, September 1991, Bell Communications Research. In this example, the ADM operates to pass signals through the ring node, to add signals at the ring node and to drop signals at the ring node.

Figure 2:
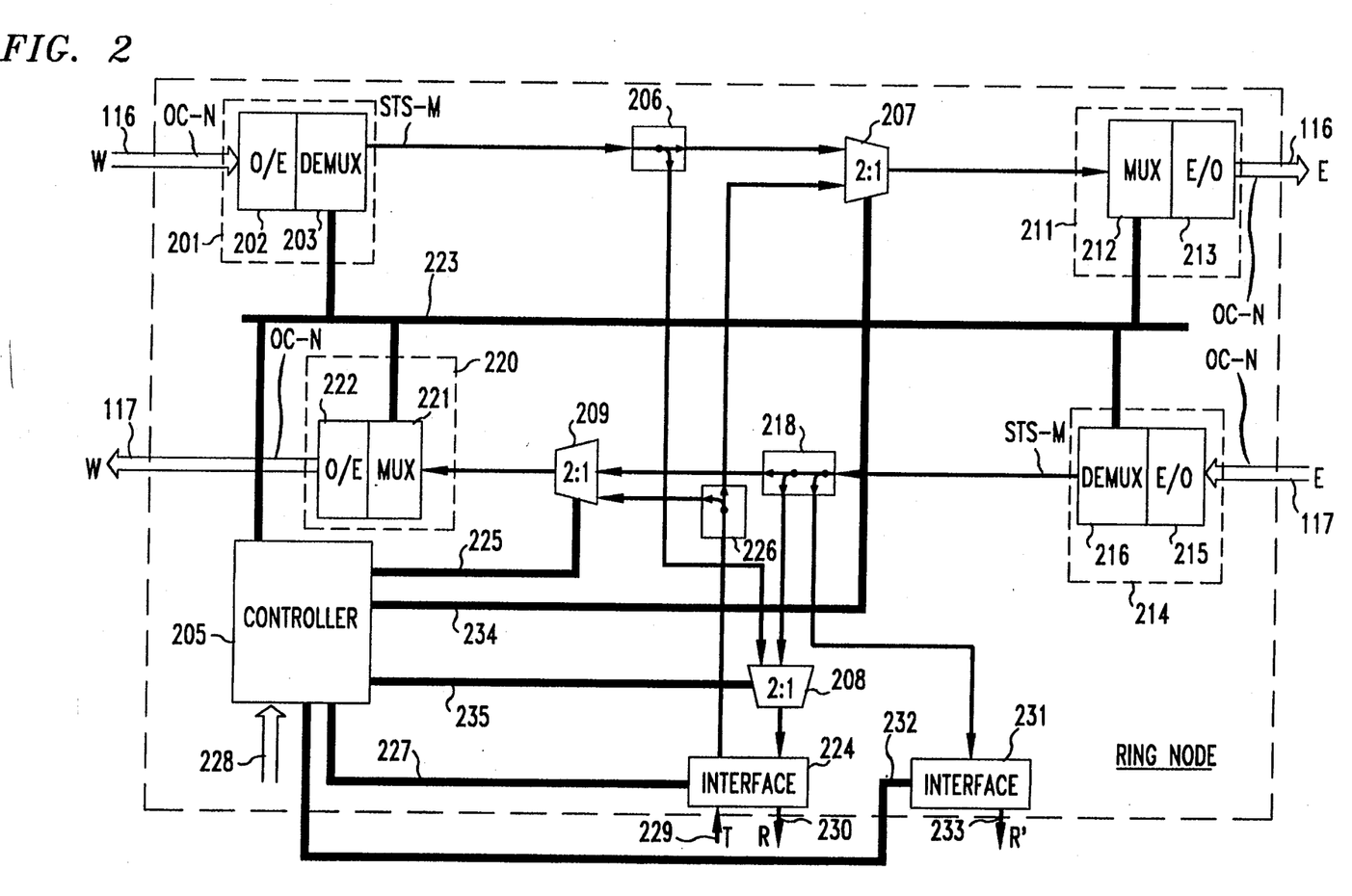
FIG. 2 shows, in simplified block diagram form, details of a ring node which may be employed in the practice of the invention.

FIG. 2 shows, in simplified block diagram form, details of ring nodes 110 through 115 and ring nodes 120 through 125. In this example, a west (W)-to-east (E) digital signal transmission direction is assumed in the bandwidth on transmission path 116. It will be apparent that operation of the ring node and the ADM therein would be similar for an east (E) - to - west (W) digital signal transmission direction in the bandwidth on transmission path 117. Specifically, shown is transmission path 116 entering the ring node and supplying an OC-N SONET optical signal to receiver 201, where N could be, for example, 3, 12 or 48. Receiver 201 includes an optical/electrical (O/E) interface 202 and a demultiplexer (DEMUX) 203, which yields at least one (1) STS-M SONET digital signal. Such O/E interfaces and demultiplexers are known. In this example, M is assumed to be three (3) and N is greater than M. The STS-M signal output from DEMUX 203 is supplied to broadcast element 206. A broadcast element replicates the STS-M signal supplied to it and supplies the replicated signals as a plurality of individual outputs. Such broadcast elements are known. Broadcast element 206 generates two identical STS-M signals and supplies one STS-M signal to an input of 2:1 selector 207 and another STS-M signal to an input of 2:1 selector 208. An STS-M signal output from 2:1 selector 207 is supplied to transmitter 211 and, therein, to multiplexer (MUX) 212. The output of MUX 212 is an electrical OC-N digital signal, which is interfaced to transmission path 116 via electrical/optical (E/O) interface 213. Such multiplexers (MUXs) and electrical/optical (E/O) interfaces are well known.

Similarly, in the east (E)-to-west (W) direction an OC-N optical signal is supplied via transmission path 117 to receiver 214 and, therein, to optical/electrical (O/E) interface 215. In turn, demultiplexer (DEMUX)

216 yields a STS-M signal which is supplied to broadcast element 218. Broadcast element 218 replicates the STS-M signal into a plurality of identical STS-M signals, in this example, three (3). One STS-M signal is supplied to an input of 2:1 selector 208, a second STS-M signal is supplied to an input of 2:1 selector 209 and a third STS-M signal is supplied to interface 231. An output from 2:1 selector 209 is supplied to transmitter 220. In transmitter 220, multiplexer (MUX) 229 multiplexes the STS-M into an electrical OC-N and, then, electrical/optical (E/O) interface 222 supplies the optical OC-N signal to transmission path 117.

Thus, in this example, broadcast element 218 supplies the secondary communications circuits from the additional shared node as candidates for through circuits and also drops the secondary communications circuits via interface 231 under control of controller 205. It should be noted that although the communications circuits are SONET STS-3 digital signals, interface 231 and interface 224 drop SONET STS-1 digital signals. Similarly, STS-1 digital signals are combined in the interfaces to form STS-3 digital signals, in known fashion. Additionally, it is noted that selector 208 selects on a STS-1 level. To this end, the STS-3 digital signals are demultiplexed in selector 208 to obtain the three STS-1 digital signals, the STS-1 signals are selected and then multiplexed back into a STS-3 signal, which is supplied to interface 224. Selector 209 is provisioned under control of controller 205, in accordance with an aspect of the invention, to normally select the STS-M signal being supplied from interface 224.

Controller 205 operates to control selection of the STS-3 signals via selectors 207, 208 and 209 based on their health. Controller 205 communicates with demultiplexers 203 and 216 and multiplexers 212 and 221 via bus 223, with interface 224 via bus 227, with interface 231 via bus 232, with selector 207 via bus 234, with selector 209 via bus 225 and with selector 208 via bus 235. Specifically, controller 205 monitors the incoming digital signals to determine loss-of-signal, alarm conditions, presence of alarm indication signal (AIS) and the like. When operating as a primary interworking ring node, controller 205 controls the dropping, via interface 231, of the secondary communications circuits being supplied from the secondary ring node of shared node 131 (FIG. 1) and the dual feeding on an STS-M signal from interface 224 via broadcast element 226 and selectors 207 and 209. When operating as a secondary interworking ring node, controller 205 controls the revertive biasing of selector 207 to normally select the STS-M signal from broadcast element 206, i.e., from the primary interworking ring node to be supplied as an output on transmission path 116, in accordance with the principles of the invention. If, however, there is a failure in the primary interworking ring node, controller 205 controls selector 207 to select the secondary communications circuit (STS-M) being supplied from interface 224 via broadcast element 226, also in accordance with an aspect of the invention. When the failure in the primary interworking ring node has been repaired or the STS-M signal otherwise becomes healthy again, selector 207 automatically reverts back to selecting it under control of controller 205. To this end, the health of the communications circuit $T_p$ from the primary node and the communications circuit $T_s$ in the secondary node is monitored to determine if selector 207 will make a real time switch to select $T_s$. It is the dual feed of $T_p$ in the primary node and the revertive real time selection via selector 207 in the secondary node that eliminated the need to also evaluate and select low level signals derived from the high level signal being groomed in the secondary node and from a corresponding communications circuit supplied from the primary node which will be combined to form a "new" communications circuit for transmission. It should be noted, however, that there is rarely a need for selector 207 to select $T_s$; it is done only under duress.

Interface 224 is employed to interface, in this example, to the particular inter-ring grooming apparatus being employed. As indicated above, in this example both interface 224 and interface 231 between STS-3 digital signals to STS-1 digital signals, in known fashion. Specifically, an STS-3 digital signal to be dropped at the ring node is supplied to interface 224 via 2:1 selector 208, under control of controller 205, from either broadcast element 206 or broadcast element 218. When operating as a primary interworking ring node, selector 208 normally is controlled to select the STS-3 signal being supplied from the west (W) via broadcast element 206 and when operating as a secondary interworking ring node selector 208 is controlled to select the STS-3 signal being supplied from the east (E) via broadcast element 218. This STS-3 signal is demultiplexed in interface 224 and supplied as three (3) STS-1 signals (R) to circuit path 230. Similarly, in the primary interworking ring node, an STS-3 secondary communications circuit being supplied, via broadcast element 218, to interface 231 is demultiplexed therein, under control of controller 205, and supplied as three (3) STS-1 signals (R') to circuit path 233. A signal (T) to be added at the ring node is supplied to interface 224 where it is converted to the STS-M digital signal format, if necessary. The STS-M digital signal is then supplied to broadcast element 226 where it is replicated. The replicated STS-M digital signals are supplied by broadcast element 226 to an input of 2:1 selector 207 and an input of 2:1 selector 209. In this example, 2:1 selectors 207 and 209, under control of controller 205, dual feed the signal being added for transmission in the bandwidth on both transmission path 116 and transmission path 117.

In summary, the provisioning of primary ring node 112 and secondary ring node 114 to realize the invention is as follows:

At primary ring node 112
    disable path switching in selector 208 for communications circuit $T_A$ incoming from the west from termination ring node 110;
    select drop port for communications circuit $T_A$;
    select drop port for communications circuit $T_s$ from secondary node 114 (note communications circuit $T_A$ and communications circuit $T_s$ occupy the same tributary to the east and west and if the normal path switching was applied it would be selecting between $T_A$ and $T_s$;

At secondary ring node 114
    disable path switching in selector 208 for communications circuit $T_A$ incoming from the east from termination ring node 110;
    enable monitor on selector 208;
    enable revertive switching of selector 208 with initial condition being through.

Additionally, the provisioning at termination ring node 110 is as follows:

Provision communications circuit to drop; For the drop, the following normal path switching functions apply:

Communications circuit $T_A$ is dual fed on the same tributary to the east and the west;

Receive communications circuit is selected based on path criteria, i.e., health of the path, from the east or west.

Controller 205 controls and monitors the status of interface 224 and the digital signals being supplied thereto via bus 227 and controls and monitors interface 231 via bus 232. Specifically, controller 205 monitors interface 224 for loss-of-signal, coding violations and the like.

Figure 3:
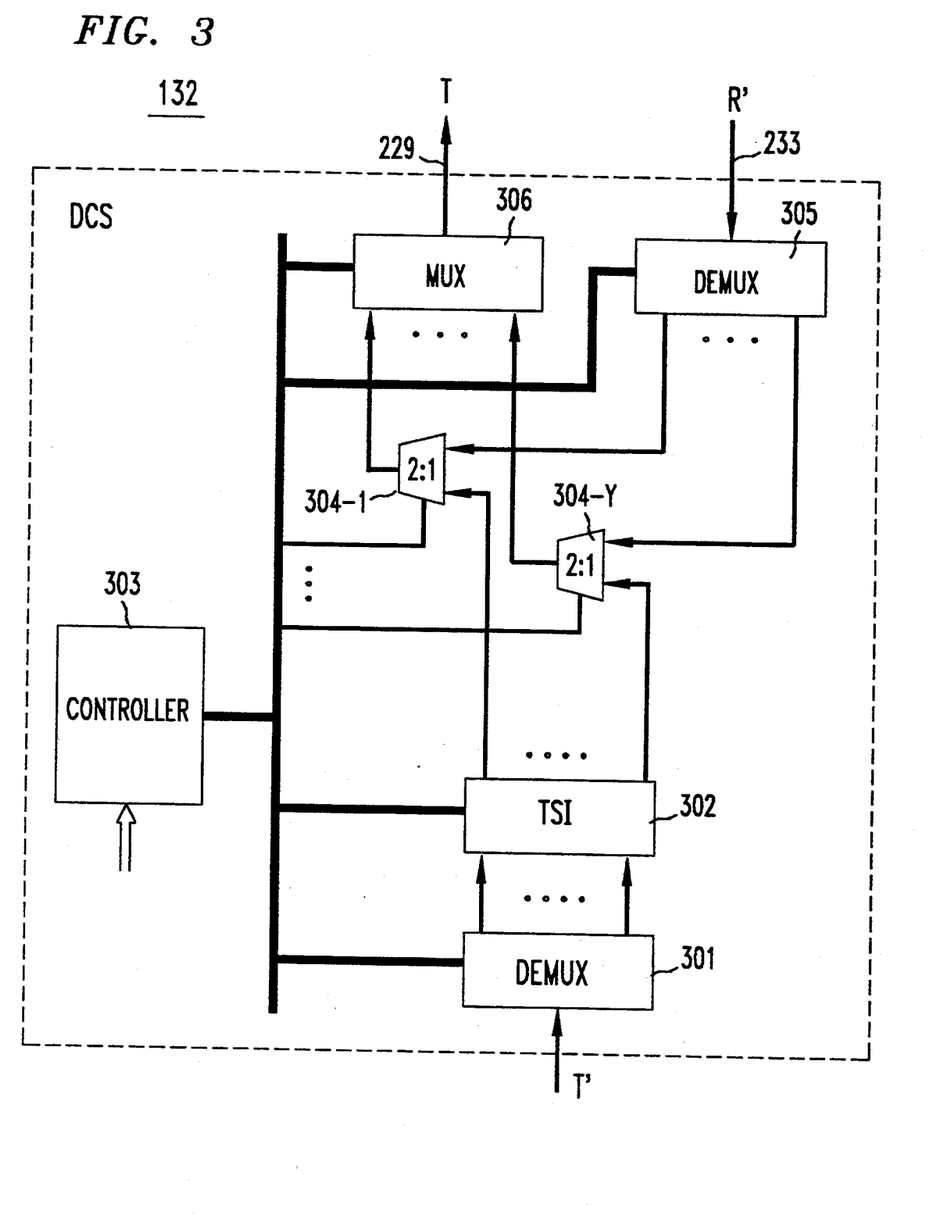
FIG. 3 shows, in simplified block diagram form, a DCS including apparatus embodying an aspect of the invention.

FIG. 3 shows, in simplified block diagram form, a digital cross-connect system (DCS) including apparatus embodying an aspect of the invention. It is noted that for brevity and clarity of description only one direction of signal transmission is shown and only one digital signal will be considered. It will be apparent to those skilled in the art that there is a similar opposite direction of transmission and that a relatively large number of digital signals would normally be groomed by such a DCS. Again, in this example, a SONET STS-1 digital signal is being groomed at the lower VT digital signal level. Specifically, shown is an STS-1 signal (T') being supplied from ring node 120 (FIG. 1) in path-switched ring 101 to DCS 132 and therein to demultiplexer (DEMUX) 301. DEMUX 301 demultiplexes the STS-1 signal to obtain the VT signals in known fashion. The VT signals are supplied to time slot interchanger (TSI) 302 where they are groomed under control of controller 303. Then, the groomed VT signals are supplied on a one-to-one basis to 2:1 selectors 304-1 through 304-Y, where Y is the number of VT signals being transported by the STS-1 signal. Similarly, a corresponding inter-ring groomed STS-1 signal (R') supplied from secondary interworking ring node 114 in shared node 131 is demultiplexed in demultiplexer (DEMUX) 305 to obtain VT signals which correspond on a one-to-one basis with the VT signals being supplied to selectors 304 from TSI 302. The VT signals from DEMUX 305 are supplied on a one-to-one basis to other inputs of selectors 305-1 through 305-Y. Controller 303 evaluates the VT signals on a pair-wise basis, in this example, in both DEMUX 301 and DEMUX 305, to determine the best VT signal in each pair and, then, causes selectors 304 to select the best VT signals. The evaluation may include monitoring the VT signals for loss of signal, AIS and/or bit error rate. The selection of the VT signals is such that the corrupted and/or failed VT signals are not selected. Thereafter, the selected VT signals are combined via multiplexer (MUX) 306 to obtain the desired inter-ring groomed STS-1 signal (T).

Figure 4:
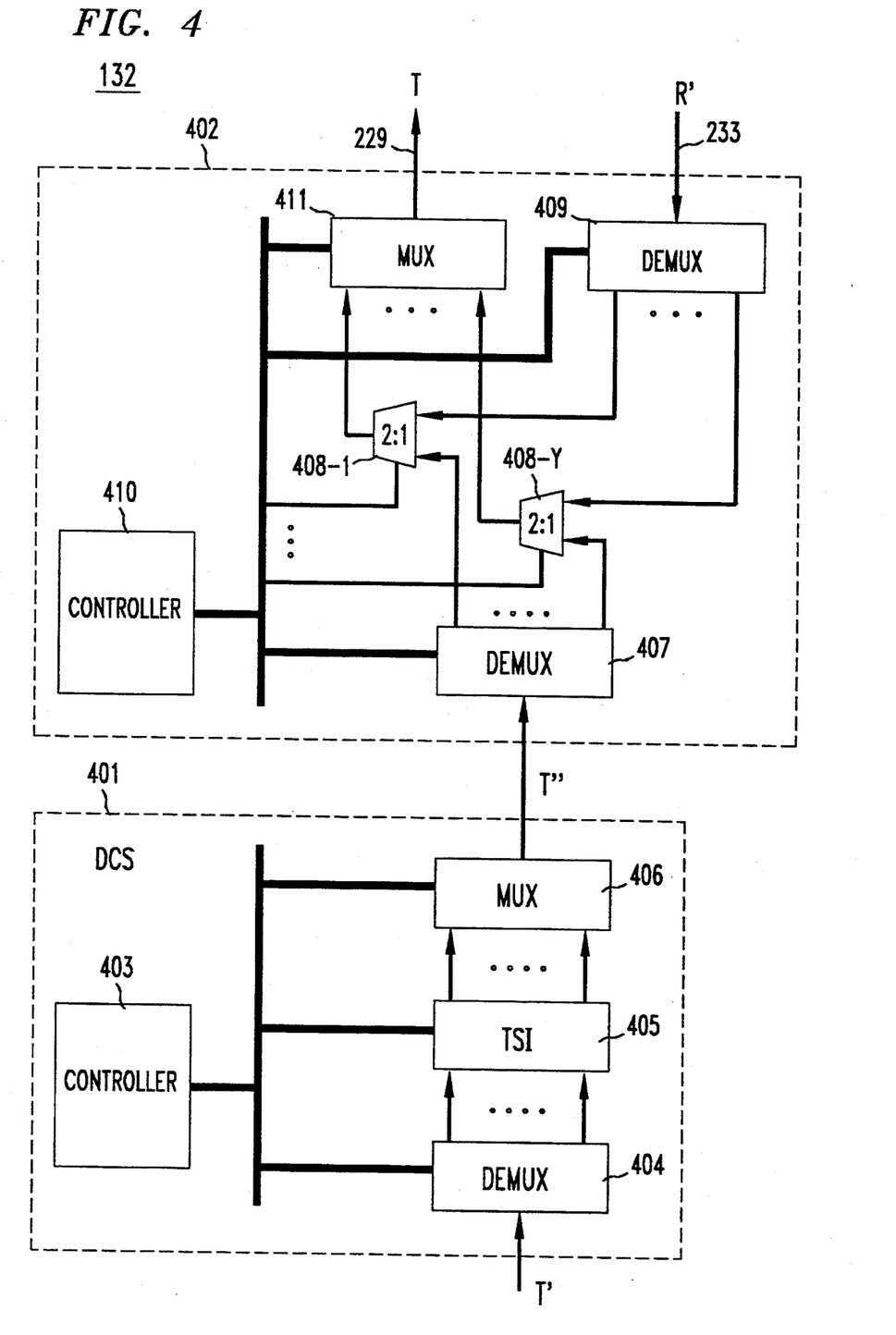
FIG. 4 shows, in simplified block diagram form, a DCS and an adjunct apparatus including an aspect of the invention.

FIG. 4 shows, in simplified block diagram form another arrangement embodying an aspect of the invention. Specifically, shown are DCS 401 and selector unit 402 which form inter-ring grooming apparatus 132. It is noted that for brevity and clarity of description only one direction of signal transmission is shown and only one digital signal will be considered. It will be apparent to those skilled in the art that there is a similar opposite direction of transmission and that a relatively large number of digital signals would normally be groomed by such a DCS. Again, in this example, a SONET STS-1 digital signal is being groomed at the lower VT digital signal level. DCS 401 includes controller 403, DEMUX 404, TSI 405 and MUX 406 and operates in known fashion to groom STS-1 signals at the VT signal level. Specifically, shown is an STS-1 signal (T') being supplied from ring node 120 (FIG. 1) in path-switched ring 101 to DCS 401 and therein to DEMUX 404. DEMUX 404 demultiplexes the STS-1 signal to obtain the VT signals in known fashion. The VT signals are supplied to TSI 405 where they are groomed under control of controller 403. Then, the groomed VT signals are supplied to MUX 406 where they are combined into a groomed STS-1 signal (T"). The groomed STS-1 signal T" is supplied to selector unit 402 and therein to DEMUX 407. DEMUX 407 demultiplexes the groomed STS-1 signal T" to obtain the VT signals. The, the VT signals are supplied on a one-to-one basis to first inputs of 2:1 selectors 408-1 through 408-Y, where Y is the number of VT signals being transported by the STS-1 signal. Similarly, a corresponding inter-ring groomed STS-1 signal (R') supplied from secondary interworking ring node 114 in shared node 131 is demultiplexed in DEMUX 409 to obtain VT signals which correspond on a one-to-one basis with the VT signals being supplied to selectors 408 from DEMUX 407. The VT signals from DEMUX 409 are supplied on a one-to-one basis to second inputs of selectors 408-1 through 408-Y. Controller 410 evaluates the VT signals on a pair-wise basis, in this example, in both DEMUX 407 and DEMUX 409, to determine the best VT signal in each pair and, then, causes selectors 408 to select the best VT signals. The evaluation may include monitoring the VT signals for loss of signal, coding errors and the like. The selection of the VT signals is such that the corrupted and/or failed VT signals are not selected. Thereafter, the selected VT signals are combined via MUX 411 to obtain the desired inter-ring groomed STS-1 signal (T).

Figure 5:
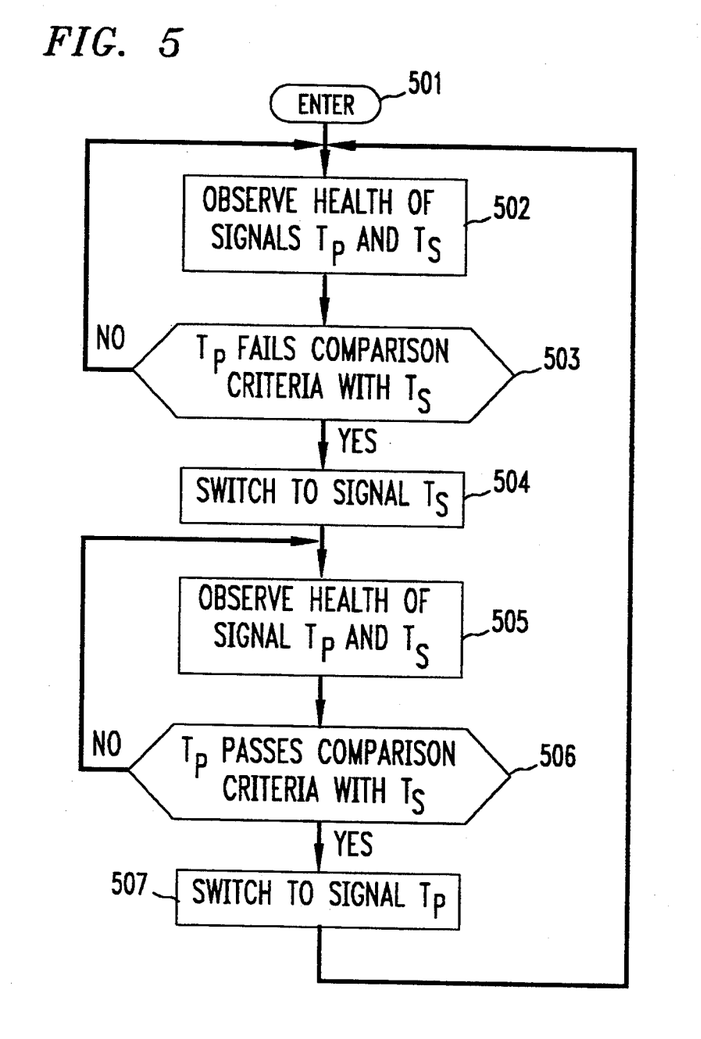
FIG. 5 is a flow chart illustrating operation in the secondary ring node of selecting either the signal from the primary ring node or the signal from the secondary ring node.

FIG. 5 illustrates in flow chart form the operation in secondary ring node 114 of selector 207 (FIG. 2) in effecting the revertive selection between new primary communications circuit $T_p$ from primary ring node 112 and secondary communications circuit $T_s$ from ring node 114. The operation is entered vi step 501. Then, step 502 causes the health to be obversed of signals $T_p$ and $T_s$. Step 503 tests to determine if signal $T_p$ fails the comparison criteria with $T_s$. If the test result is NO, $T_p$ is normal, and control is returned to step 502 and steps 502 and 503 are iterated. If the test result in step 503 is YES, $T_p$ is abnormal, and step 504 causes a switch to signal $T_s$. Then, step 505 causes the health to be observed of signals $T_p$ and $T_s$. Step 506 tests to determine if signal $T_p$ passes the comparison criteria with $T_s$. If the test result is NO, $T_p$ continues to be abnormal, and control is returned to step 505 and steps 505 and 506 are iterated. If the test result in step 506 is YES, $T_p$ has returned to normal, and step 507 causes a switch, i.e., an automatic reversion, to signal $T_p$ and control is returned to step 502. Thereafter, the process is repeated.

Figure 6:
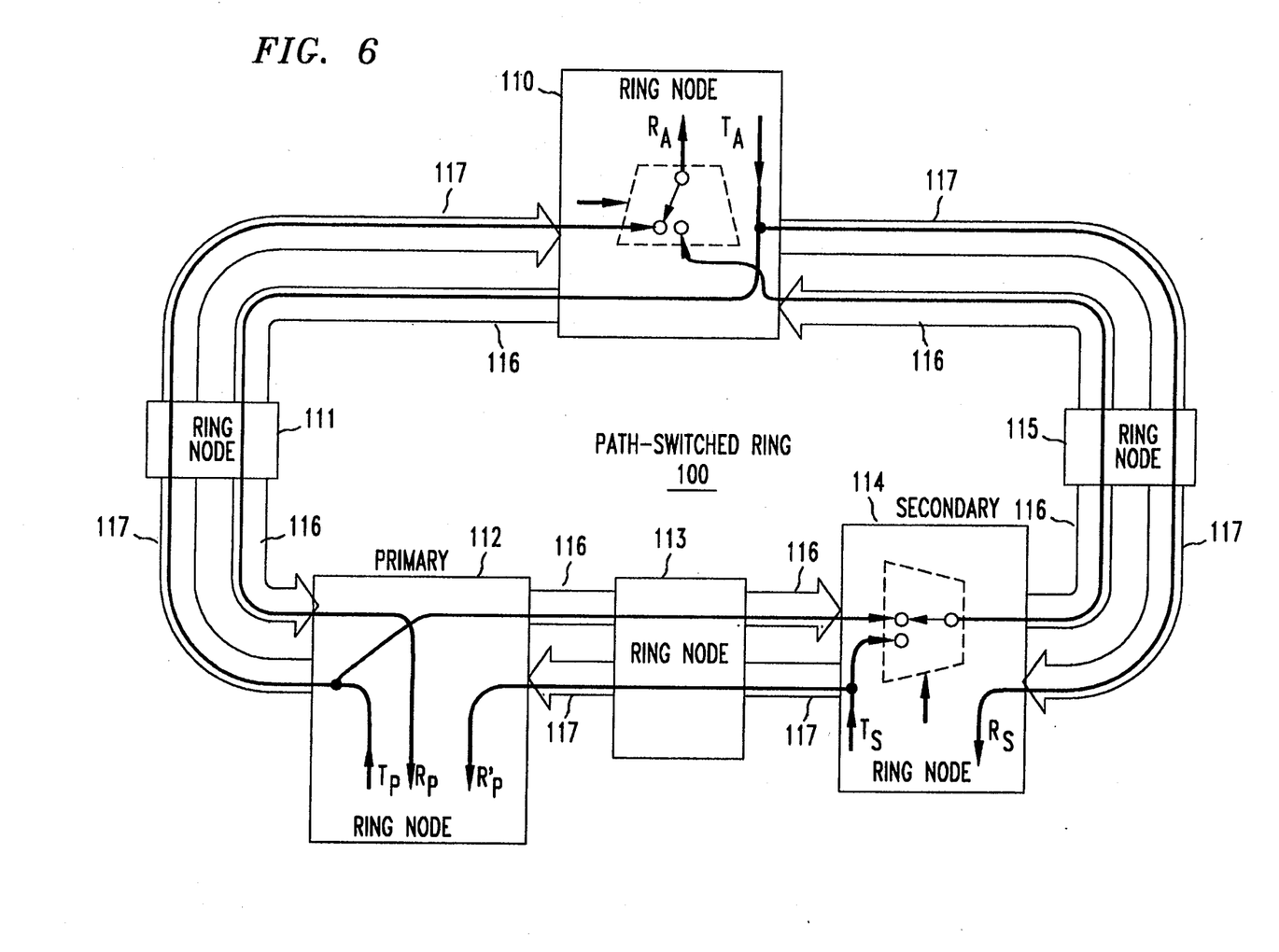
FIG. 6 illustrates the "normal" operation in path-switched ring 100 including the first and second shared nodes.

FIG. 6 illustrates in simplified form a "normal" ring interworking communications circuit connection in path-switched ring 100. Specifically, the communications circuit connection is between ring node 110, the A termination, and its primary interworking ring node 112 and its secondary interworking node 114. Thus, one portion ($T_A$) of the duplex communications circuit enters ring 100 at ring node 110 and is supplied in the bandwidth of transmission path 116 through ring node 111 to its primary interworking ring node 112 and is supplied in the bandwidth of transmission path 117 through ring node 115 to its secondary interworking ring node 114. The transmit portion, i.e., $T_A$ of the communications circuit is normally handed-off as $R_p$ in ring node 112 and as $R_s$ in ring node 114. Similarly, another portion ($T_P$) of the duplex communications circuit normally enters ring 100 at its primary interworking ring node 112 and is supplied to the bandwidth of transmission path 117 and to the bandwidth of transmission path 116. $T_P$ is supplied in transmission path 116 via ring node 113 to secondary interworking ring node 114. In ring node 114 $T_P$ is normally selected and supplied through ring node 115 to ring node 110 where it is also received as $R_A$. In transmission path 117, this portion of the communications circuit is passed through ring node 111 and received as $R_A$ at ring node 110. Ring node 110 normally selects $R_A$ from transmission path 117. Additionally, this portion of the communications circuit is supplied as $T_S$ from secondary interworking ring node 114 in the bandwidth of transmission path 117 through ring node 113 and is dropped at primary ring node 112 as unidirectional communications circuit $R'_p$ in accordance with an aspect of the invention. Then communications circuit $R'_p$ is available so that the lower level digital signals may be obtained for comparison and selection, in accordance with the invention. Secondary interworking ring node 114

Figure 7:
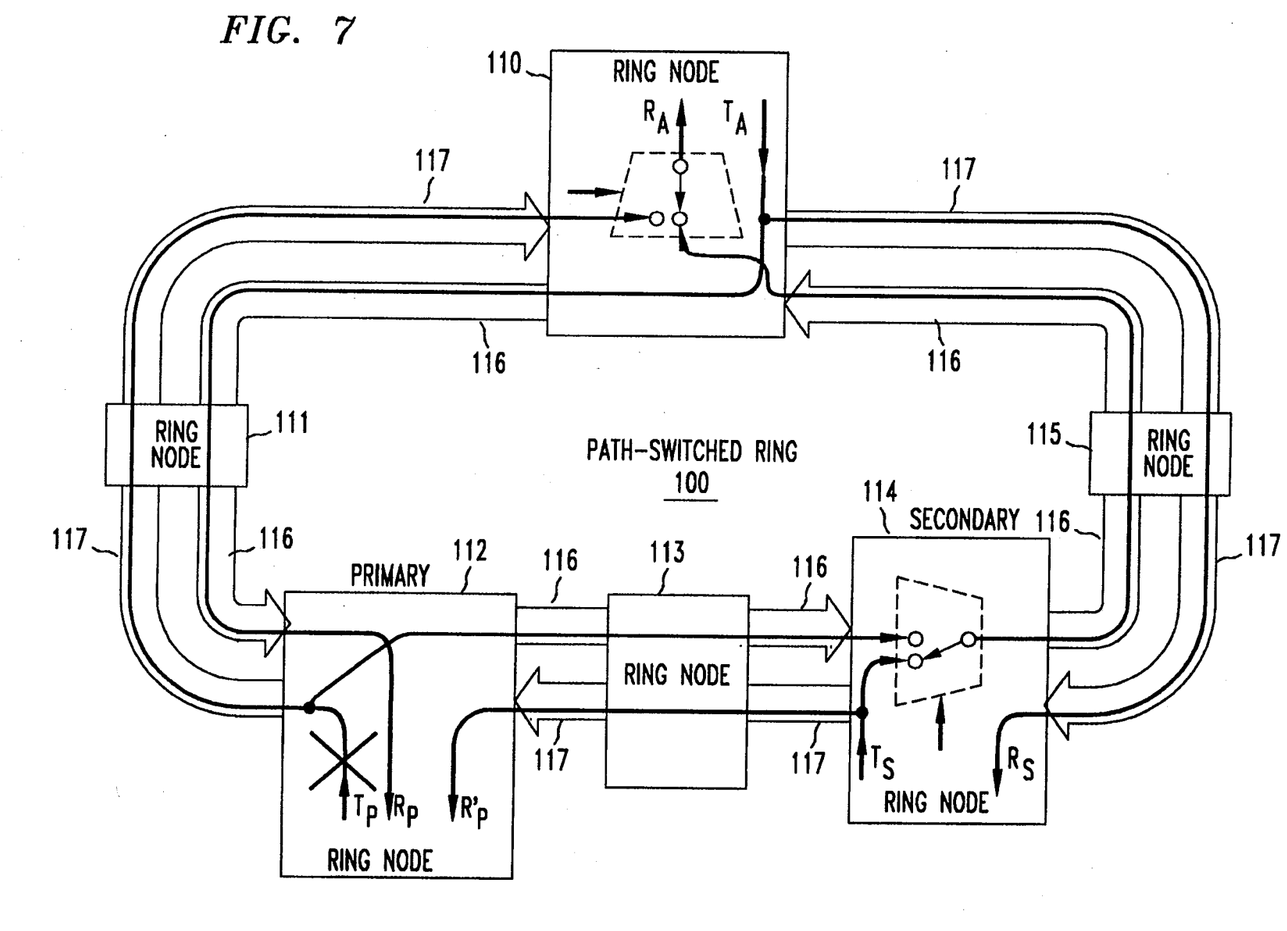
FIG. 7 illustrates the operation in path-switched ring 100 in the presence of a failure of a so-called hand-off link to the first ring node 112.

FIG. 7 illustrates the ring interworking communications circuit transmission in ring 100 when a failure arises in the hand-off link in its primary interworking node 112. As indicated above, when a portion of the hand-off link fails, for example, the transmit portion $T_p$, the same "good" transmit signal $T_S$ is selected in secondary interworking ring node 114 and supplied in the bandwidth on transmission path 116 to ring node 110. Ring node 110 selects the transmit signal $T_S$ from transmission path 116 as receive signal $R_A$. Primary interworking ring node 112 can still select the received portion ($R_p$) of the communications circuit from ring node 110. However, if the received portion of the hand-off link has failed, secondary interworking ring node 114 selects the received signal ($R_s$), which is being supplied on transmission path 117 from ring node 110.

The above-described arrangements are, of course, merely illustrative of the application of the principles of the invention. Other arrangements may be devised by those skilled in the art without departing from the spirit or scope of the invention. It will be apparent that evaluation and selection of the lower level digital signals from the primary inter-ring groomed communications circuits and the secondary inter-ring groomed communications circuits could also be included in the primary ring nodes.

I claim:

1. A communications system including,
 a first path-switched ring transmission system including first and second communications paths for transporting first digital signals in communications circuits in opposite directions around the ring,
 a second path-switched ring transmission system including first and second communications paths for transporting first digital signals in communications circuits in opposite directions around the ring,
 said first digital signals in communications circuits to be transported in said fist and second path-switched ring transmission systems each having a first bit rate and includes a plurality of second digital signals each of which has a second bit rate lower than the first bit rate of said first digital signals,
 a first interworking node having a first ring node in each of the first and second path-switched ring transmission systems and a first inter-ring grooming apparatus interposed between the first ring nodes for arranging the lower bit rate second digital signals into primary communications circuits at the first bit rate,
 a second interworking node having second ring nodes in each of the first and second path-switched ring transmission systems and a second inter-ring grooming apparatus interposed between the second ring nodes for arranging the lower bit rate second digital signals into primary communications circuits at the first bit rate, one of said interworking nodes being a primary interworking node and the other of said interworking nodes being a secondary interworking node,
 the communications system further comprising,
 at least one of said second ring nodes in said second interworking node being provisioned to supply a first digital signal in at least one secondary inter-ring groomed communications circuit to the first ring node in said first interworking node in the same path-switched ring transmission system as said at least one second ring node, the at least one secondary inter-ring groomed communications circuit corresponding to a primary inter-ring groomed communications circuit being supplied from the first inter-ring grooming apparatus,
 means for demultiplexing the first digital signal in at least one secondary communications circuit to obtain the plurality of lower bit rate second digital signals,
 means for evaluating in accordance with prescribed criteria the lower bit rate second digital signals from the at least one secondary communications circuit on a pair-wise basis with corresponding lower bit rate second digital signals of the first digital signal in a corresponding primary communications circuit to determine the lower bit rate second digital signal in each pair which is least corrupted,
 means responsive to the results of the evaluating for selecting the least corrupted one of the lower bit rate second digital signals in the pairs,
 means for combining the selected lower bit rate second digital signals into a new primary communications circuit,
 means for inserting the new primary communications circuit into the first and second communications paths in the path-switched ring transmission system, and
 means in the at least one second ring node for normally selecting the new primary communications circuit from the first ring node in the same path-switched ring transmission system as said at least one second ring node to be passed through it on a communications path, wherein the evaluation and selection of the lower bit rate second digital signals is only performed in the primary one of the interworking ring nodes.

2. The invention as defined in claim 1 wherein said means for selecting includes controllable selector means for selecting the first digital signal from the new primary communications circuit being supplied from the the first ring node in the primary interworking node during normal conditions and for selecting the the first digital signal from the corresponding secondary communications circuit being supplied from the second ring node in the secondary interworking node in the same ring transmission system including the first ring node during abnormal conditions.

3. The invention as defined in claim 2 wherein said means for selecting further includes means for controlling said means for selecting to automatically revert to selecting the the first digital signal in the new primary communications circuit upon a return from the abnormal conditions to the normal conditions.

4. The invention as defined in claim 3 wherein the means for inserting includes means for dual feeding the first digital signal from the new primary communications circuit to each of the first and second communications paths in the same ring transmission system including the first ring node.

5. The invention as defined in claim 3 wherein the first digital signals in the communications circuits from at least one of said first and second path-switched ring transmission systems are each supplied to each of the first and second inter-ring grooming apparatus for inter-ring grooming of the lower bit rate second digital signals therein.

6. The invention as defined in claim 3 wherein the at least one second ring node includes means for dual feeding the the first digital signal in the secondary communications circuit to the first ring node in the same path-switched ring transmission system as said at least one second ring node and to the means for selecting.

7. The invention as defined in claim 4 wherein said first digital signals in said communications circuits are comprised of SONET STS type digital signals and said lower bit rate second digital signals are SONET VT type digital signals.

8. The invention as defined in claim 4 wherein said first digital signals in said communications circuits are comprised of DS3 digital signals and said lower bit rate second digital signals are DS1 digital signals.

9. The invention as defined in claim 4 wherein said first digitals signals in said communications circuits are comprised of SDH STM type digital signals and said lower bit rate second digital signals are SDH VC lower order digital signals.

* * * * *